United States Patent
Schutt et al.

(10) Patent No.: US 12,107,896 B2
(45) Date of Patent: Oct. 1, 2024

(54) AUTOMATING TRUST IN SOFTWARE UPGRADES

(71) Applicant: Cisco Technology, Inc., San Jose, CA (US)

(72) Inventors: Jeffrey G. Schutt, Davis, CA (US); Max Pritikin, Boulder, CO (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 280 days.

(21) Appl. No.: 17/560,599

(22) Filed: Dec. 23, 2021

(65) Prior Publication Data

US 2023/0208880 A1    Jun. 29, 2023

(51) Int. Cl.
*H04L 9/40* (2022.01)
*G06F 8/65* (2018.01)
*G06F 21/56* (2013.01)
*G06F 21/57* (2013.01)
*G06N 3/09* (2023.01)
*G06N 20/00* (2019.01)
*G06F 8/71* (2018.01)
*G06F 21/51* (2013.01)

(52) U.S. Cl.
CPC ............... *H04L 63/20* (2013.01); *G06F 8/65* (2013.01); *G06F 21/563* (2013.01); *G06F 21/566* (2013.01); *G06F 21/577* (2013.01); *G06N 3/09* (2023.01); *G06N 20/00* (2019.01); *G06F 8/71* (2013.01); *G06F 21/51* (2013.01)

(58) Field of Classification Search
CPC ... H04L 63/20; G06F 8/65; G06F 8/71; G06F 21/563; G06F 21/566; G06F 21/577; G06F 21/51; G06N 3/09; G06N 20/00
See application file for complete search history.

(56) References Cited

U.S. PATENT DOCUMENTS 11,436,330 B1 *  9/2022  Jennings ............... G06F 21/563
2015/0067670 A1   3/2015  Benson et al.
(Continued)

OTHER PUBLICATIONS

NTIA, "Roles and Benefits for SBOM Across the Supply Chain", Nov. 8, 2019, 28 pages.
(Continued)

*Primary Examiner* — Cheng-Feng Huang
(74) *Attorney, Agent, or Firm* — Edell, Shapiro & Finnan, LLC

(57) ABSTRACT

A method, computer system, and computer program product are provided for automatically analyzing software packages to identify the degree of differences between compared software packages and to apply security policies. A first software bill of materials for a software package is processed to extract a plurality of components of the software package, wherein the first software bill of materials indicates a first hierarchy of components based on relationships between components. The first hierarchy is compared to a second hierarchy, the second hierarchy corresponding to a second software bill of materials, to determine a degree of difference between the first hierarchy and the second hierarchy. The degree of difference is compared to one or more threshold values. A security policy is applied with respect to the software package according to a comparison of the degree of difference to the one or more threshold values.

20 Claims, 6 Drawing Sheets

(56) References Cited

U.S. PATENT DOCUMENTS

| | | | |
|---|---|---|---|
| 2016/0117160 A1 | 4/2016 | Parthasarathy et al. | |
| 2016/0139915 A1* | 5/2016 | Dimitrakos | G06F 8/61 717/126 |
| 2018/0157532 A1* | 6/2018 | Kumar | G06F 9/5061 |
| 2020/0134196 A1* | 4/2020 | Collins | G06F 21/51 |
| 2021/0240458 A1 | 8/2021 | O'Connell et al. | |
| 2021/0264031 A1 | 8/2021 | Dhillon et al. | |
| 2022/0109684 A1* | 4/2022 | Jain | H04L 63/1425 |

OTHER PUBLICATIONS

NTIA, "NTIA Multistakeholder Process on Software Component Transparency", Apr. 27, 2021, 3 pages.

GitHub, "Package URL specification v1.0.X", May 3, 2021, 12 pages; https://github.com/package-url/purl-spec/blob/master/PURL-SPECIFICATION.rst.

Danai Koutra et al., "Algorithms for Graph Similarity and Subgraph Matching", Proc. Ecol. Inference Conf., vol. 17, Dec. 4, 2011, 50 pages.

Wikipedia, "Graph edit distance", retrieved from Internet Dec. 23, 2021, 5 pages; https://en.wikipedia.org/wiki/Graph_edit_distance.

"SBOM at a Glance," NTIA Multistakeholder Process on Software Component Transparency, https://www.ntia.gov/files/ntia/publications/sbom_at_a_glance_apr2021.pdf, Last Revised Apr. 27, 2021, 3 pages.

"Framing Software Component Transparency Establishing a Common Software Bill of Material (SBOM)" NTIA Multistakeholder Process of Software Component Transparency, https://www.ntia.gov/files/ntia/publications/framingsbom_20191112.pdf, Nov. 23, 2019, 29 pages.

Alex Birsan, "Dependency Confusion: How I Hacked into Apple, Microsoft and Dozens of Other Companies," Medium, https://medium.com/@alex.birsan/dependency-confusion-4a5d60fec610, Feb. 9, 2021, 20 pages.

Joseph R. Biden, Jr., "Executive Order on Improving the Nation's Cybersecurity," The White House, https://www.whitehouse.gov/briefing-room/presidential-actions/2021/05/12/executive-order-on-improving-the-nations-cybersecurity/, May 12, 2021, 23 pages.

* cited by examiner

AUTOMATING TRUST IN SOFTWARE UPGRADES

TECHNICAL FIELD

The present disclosure relates to computing security and information technology, and more specifically, to automating trust in software upgrades and other operations based on software bills of materials.

BACKGROUND

In the field of computing security and information technology, updates to software packages are frequently associated with security risks, as any modification can potentially insert unintended or undesired functionality into software. For example, a software upgrade may introduce a new vulnerability, re-introduce a previously-patched vulnerability, or otherwise cause the software to behave in a manner that adversely impacts a computing environment.

When reviewing changes to software packages, it can be difficult to determine whether a change is acceptable with respect to security governance, certification, threat modeling, ongoing operations, and other work. As tasks are increasingly automated, new forms of exploits have become more popular. For example, a dependency confusion attack can occur when a software installer script is deceived into pulling a malicious code file from a public repository, instead of obtaining the intended file from an internal repository.

DESCRIPTION OF EXAMPLE EMBODIMENTS

Overview

Figure 1:
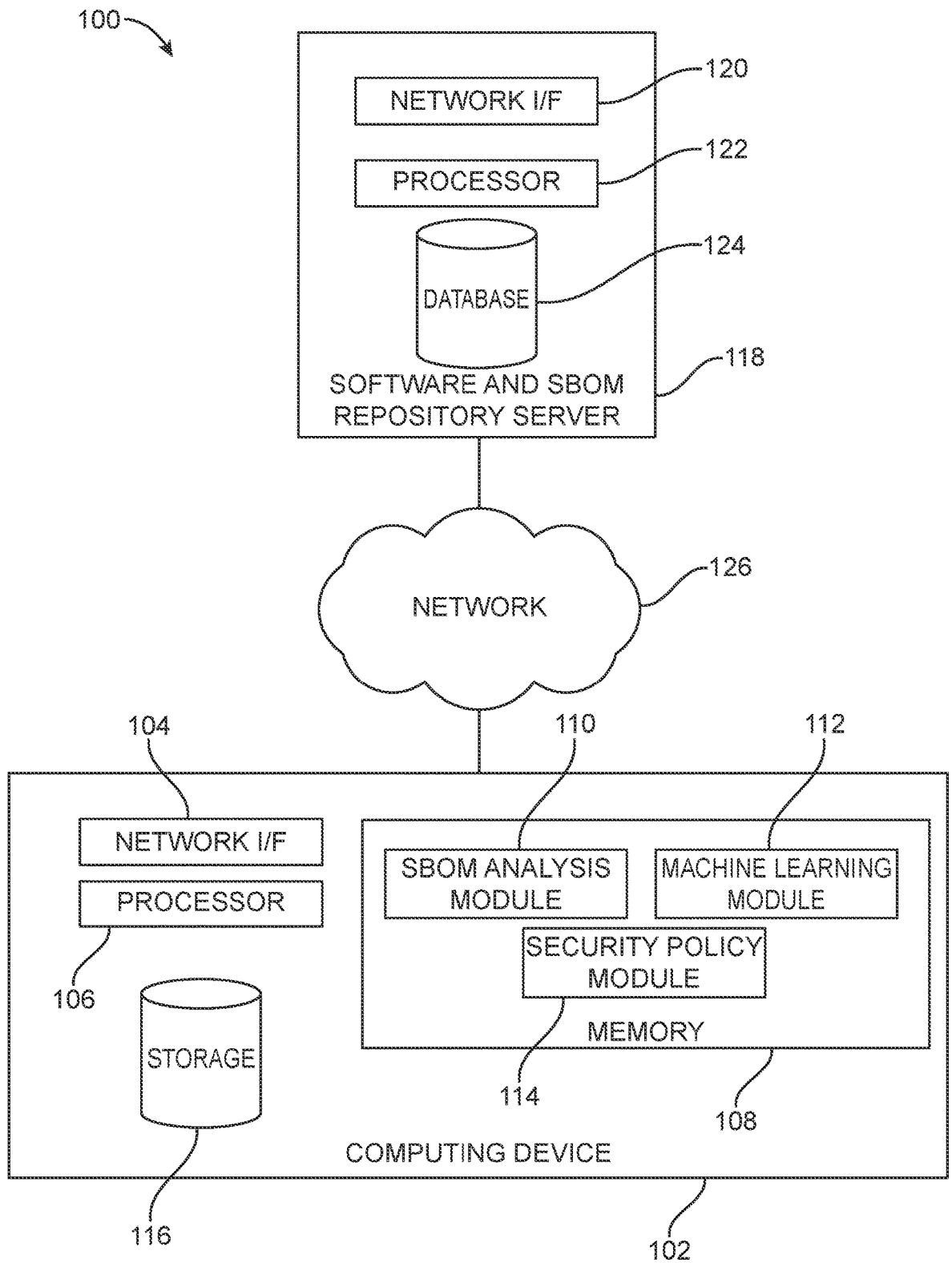
FIG. 1 is a block diagram depicting an environment for automatically analyzing software packages and associated SBOMs and applying security policies, in accordance with an example embodiment.

According to one embodiment, techniques are provided for automatically analyzing software packages to apply security policies, to identify the degree of differences between compared software packages, and to perform other operations. A first software bill of materials for a software package is processed to extract a plurality of components of the software package, wherein the first software bill of materials indicates a first hierarchy of components based on relationships between components. The first hierarchy is compared to a second hierarchy, the second hierarchy corresponding to a second software bill of materials, to determine a degree of difference between the first hierarchy and the second hierarchy. The degree of difference is compared to one or more threshold values. A security policy is applied with respect to the software package according to a comparison of the degree of difference to the one or more threshold values.

EXAMPLE EMBODIMENTS

Embodiments are provided for automatically performing computer security tasks, and more specifically, for automating trust in software upgrades and other operations based on software bills of materials.

In the field of computing security and information technology, knowledge of a software package's components can be extremely useful for security purposes, as individual components can be associated with specific vulnerabilities, incompatibilities, or other issues. Automated processes, such as continuous integration and/or continuous deployment software paradigms, enable software developers to automatically pull the most recent version of third-party software from network-accessible repositories at the time of compilation or installation. Thus, some attacks, such as dependency confusion attacks, exploit the fact that third-party software is constantly changing by sneaking vulnerabilities into a software package via its third-party dependencies.

Accordingly, present embodiments provide an automated approach for analyzing software packages to identify whether any updates or changes to the packages are substantial or minor, and depending on the degree of change, evaluating the risk of using the updated or modified software packages. A software bill of materials (SBOM) can be provided for a software package that lists the components of the software package. A software package's bill of materials may indicate a hierarchy of components and sub-components that make up the software package. For example, a software package may include three main components, each of which has one or more sub-components, such as libraries, plug-ins, and the like. In addition to listing the components of a software package, an SBOM may also indicate the relationships (e.g., dependencies) between components, which can be used to construct a hierarchy of constituent components of any given software package. One can compare the hierarchies of two or more software packages to identify differences between the software packages. Present embodiments compare similar software generated at different points in time. Three non-exhaustive examples are:

1. two SBOMs for two versions of the same software package, such as during a software upgrade (where one version is of a previous release)

2. two SBOMs as generated by different SBOM generating tooling operating on the same version of a software package 3. two SBOMs as generated during different stages of development such as one generated from source code and the other from a generation tool.

Using techniques such as graph edit distance analysis, the magnitude of the difference between software packages can be ascertained, which can be used to enforce fully-automated security policies that selectively grant or deny software packages access to systems. For example, if a first software package is within a threshold degree of similarity to a second software package that is known to be safe, the first software package may be permitted to execute or access a database, etc.

Thus, present embodiments provide an automated approach for evaluating software packages, which provides a practical application of quickly determining whether a software package should be trusted. Once a software package is confirmed as trustworthy, the software package may be permitted to execute in a computing environment, may be included in a software update, may be approved to access a computing network, may be approved to process data, and the like. Accordingly, present embodiments improve the field of computing security and information technology by extending security policies to new or unknown software packages, thereby increasing the security of computing systems and networks.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Embodiments are now described in detail with reference to the figures. FIG. 1 is a block diagram depicting an environment 100 for automatically analyzing software packages and applying security policies, in accordance with an example embodiment. As depicted, environment 100 includes a computing device 102, a software development server 118, and a (communication) network 126. It is to be understood that the functional division among components of environment 100 have been chosen for purposes of explaining various embodiments and is not to be construed as a limiting example.

Computing device 102 includes a network interface (I/F) 104, at least one processor 106, memory 108, and storage 116. Memory 108 stores software instructions for a software bill of materials (SBOM) analysis module 110, a machine learning module 112, and a security policy module 114. Computing device 102 may include, for example, a laptop computer, a tablet computer, a netbook computer, a personal computer (PC), a desktop computer, a personal digital assistant (PDA), a smart phone, a thin client, a rack-mounted server, or any programmable electronic device capable of executing computer readable program instructions. Network interface 104 may include one or more network interface cards, line cards, etc., and enables components of computing device 102 to send and receive data over a network, such as network 126. In general, computing device 102 analyzes SBOMs of software packages in order to apply security policies to those software packages, in accordance with the embodiments presented herein. Computing device 102 may include internal and external hardware components, as depicted and described in further detail with respect to FIG. 6.

SBOM analysis module 110, machine learning module 112, and security policy module 114 may include one or more modules or units to perform various functions of the embodiments described below. SBOM analysis module 110, machine learning module 112, and security policy module 114 may be implemented by any combination of any quantity of software and/or hardware modules or units, and may reside within memory 108 of computing device 102 for execution by a processor, such as processor 106.

SBOM analysis module 110 may obtain and analyze SBOMs relating to software packages. An SBOM may include a listing of components in a software package, as well as the relationship between components. As some components may include other components (e.g., dependencies), the relationships between components can be used to determine a comprehensive hierarchy of a software package's components. In some embodiments, an SBOM contains structured data, and the identities of components and/or relationships between components can be indicated by the schema of the SBOM. In some embodiments, the components and/or component relationships of a software package may be described in unstructured text, and a conventional or other natural language processing model may be applied to the unstructured text to extract the identities of the components and/or relationships between components.

SBOM analysis module 110 may assemble the extracted components and/or relationships between components into a hierarchy or other suitable data structure. For example, a software package may include two components at the top of the hierarchy, each of which have one or more sub-components, etc. The hierarchy can accordingly have as many tiers as a corresponding software package has levels of dependencies.

SBOM analysis module 110 can compare hierarchies corresponding to two different software packages in order to identify differences between the hierarchies, thereby identifying differences between the software packages themselves. In some embodiments, SBOM analysis module 110 may perform graph edit distance analysis, which can identify the differences between graphs such as the hierarchies extracted from SBOMs. Using graph edit distance analysis, SBOM analysis module 110 can compare two hierarchies to identify any changes between the two, including new components, removed components, swapped-out or modified components, as well as changes to relationships between components, such as new dependencies, removed dependencies, modified dependencies, and the like. SBOM analysis module 110 may compute a score by assigning values for each difference that is identified between compared hierarchies. In some embodiments, the values can be weighted so that certain types of differences can attribute different values to the overall score. For example, removal of a component may be weighted with a first weight, addition of a component may be weighted with a second weight, and replacement of a component may be weighted with a third weights. The weights can be any numerical value, including zero values, non-zero values, positive values, and negative values. For example, a weighting of zero may be applied to a certain type of change so that the change can be omitted from contributing to an overall score. For example, a software component that comes from a known trusted source may be provided with a weight of zero to prevent the presence of that software component from affecting the overall score. The overall score can be a sum or other combination (e.g., average, root sum of squares, etc.) of the (optionally weighted) values for each identified difference between two hierarchies. Thus, an overall score may represent a degree or magnitude of difference between two hierarchies.

SBOM analysis module 110 may compare hierarchies of software packages for a variety of purposes. In some embodiments, an updated software package can be compared to a previous version to determine the degree of difference between the two versions; if the degree of difference is below a threshold value, then the updated version may be executed, installed, permitted to access a network, and the like. In some embodiments, the hierarchies that are compared may be generated based on a same software package using different SBOM generation tools; thus, SBOM analysis module 110 can determine whether different automated approaches to generating SBOMs correspond to a same hierarchy, or if the tools generate SBOMs that contain substantive differences (which can imply that one or both tools are inaccurate).

Machine learning module 112 may train and apply machine learning models to perform tasks such as determining thresholds for overall scores that can be used for a variety of security purposes, determining version numbers for software updates based on overall scores, determining whether a degree of difference between compared hierarchies of software packages is substantial or not (and applying security polices accordingly), and/or other tasks. In some embodiments, machine learning module 112 may be trained to identify graph edit distance thresholds that can be applied to an overall score to determine whether the difference between two software packages is substantial or not. In particular, pattern recognition may be achieved by providing a machine learning model with training data that includes degree of difference scores for compared software packages that are labeled as to whether the differences between the software packages is substantial or not. Similarly, machine learning module 112 can identify, based on the labels provided to the training data, whether changes are acceptable changes, de minimis changes, and the like. The particular type of machine learning model may include an artificial neural network, such as a convolutional neural network or recurrent neural network, or other suitable classifying model for single or multi-class classification.

In some embodiments, machine learning module 112 may train a machine learning model using training data that further includes labels of the types of components in a software package, and/or labels that include functions or other qualities of those components. For example, examples components in the training data can include components that are labeled to indicate that a component includes an executable, to indicate that the component includes a library, to indicate that a component requires elevated privileges to execute, to indicate that a component stores unencrypted personal identifying information to memory, to indicate that a component is provided by a particular developer, to indicate that a component is a known trusted or known untrusted component, and the like. Thus, a machine learning model can be trained to identify a threshold for determining whether a software package is substantially different from another package, as well as determining whether the software package is substantially different based on particular changes to a software package, such as replacing a component that stores data in an encrypted format with a component that does not encrypt its data.

Additionally or alternatively, machine learning module 112 may train and apply a machine learning model that can automatically perform software versioning. Machine learning may be performed using a set of training data that includes examples of graph edit distances between hierarchies of software packages and version numbers for those software packages. Thus, a machine learning model can be developed to determine, based on the degree of difference between a previous software package and an updated software package, the version number for the updated software package given the previous software package's version number.

Security policy module 114 applies security policies based on the degree of difference between compared hierarchies of software packages. In some embodiments, the graph edit distance is compared to a threshold value to determine how to apply a security policy to a software package. If the graph edit distance does not satisfy the threshold value, then an updated software package may not be substantially different from a previous software package (to which the updated software package was compared), and therefore, the updated software package may be treated similarly as the previous software package (e.g., by applying the same security settings, permissions, etc.). If a modified software package is substantially different from a previously-approved version, however, the modified software package may be denied access by security policy module 114, flagged for manual inspection, and the like. In some embodiments, security policy module 114 may instruct SBOM analysis module 110 to compare software packages, in accordance with present embodiments, in response to an update becoming available for a software package. In some embodiments, security policy module 114 may apply a granular security policy that increasingly restricts a software package's permissions the more that the software package deviates from a permitted software package. For example, if the last trusted software package is version 1.0, then version 1.3 would be granted fewer permissions, and version 1.5 would be granted even fewer permissions (depending on the actual graph edit distances of the compared hierarchies of the higher-version software packages to version 1.0).

Storage 116 may include any non-volatile storage media known in the art. For example, storage 116 can be implemented with a tape library, optical library, one or more independent hard disk drives, or multiple hard disk drives in a redundant array of independent disks (RAID). Similarly, data in storage 116 may conform to any suitable storage architecture known in the art, such as a file, a relational database, an object-oriented database, and/or one or more tables. Storage 116 may store data relating to software packages, including SBOMs, hierarchical relationships between components of software packages, listings of approved or denied software packages, security policy data, and the like.

Software and SBOM repository server 118 includes a network interface (I/F) 120, at least one processor 122, and a database 124. Network interface 120 may include one or more network interface cards, line cards, etc., and enables components of software and SBOM repository server 118 to send and receive data over a network, such as network 126. In general, software and SBOM repository server 118 may function as a repository for software packages and/or components of software packages, including third-party components as well as a repository for metadata about those components and packages, e.g. SBOMs, or these may be obtained dynamically. Software and SBOM repository server 118 may include internal and external hardware components, as depicted and described in further detail with respect to FIG. 6. Multiple instances of software and SBOM repository server may be queried by computing device 102 to enable SBOM analysis module 110, machine learning module 112, and security policy module 114.

Database 124 may include any non-volatile storage media known in the art. For example, database 124 can be implemented with a tape library, optical library, one or more independent hard disk drives, or multiple hard disk drives in a redundant array of independent disks (RAID). Similarly, data in database 124 may conform to any suitable storage architecture known in the art, such as a file, a relational database, an object-oriented database, and/or one or more tables. Database 124 may store software packages and/or SBOMs corresponding to software packages. In some embodiments, software and SBOM repository server 118 responds to requests from requesting entities, such as computing device 102, for data (e.g., a particular software package and its corresponding SBOM) by providing the data to the requesting entity. Thus, computing device 102 can access database 124 to obtain data relating to software packages and/or the SBOMs of software packages, including different versions of a same software package, in order to analyze software packages in accordance with present embodiments.

Network 126 may include a local area network (LAN), a wide area network (WAN) such as the Internet, or a combination of the two, and includes wired, wireless, or fiber optic connections. In general, network 126 can be any combination of connections and protocols known in the art that will support communications between computing device 102 and software and SBOM repository server 118 via their respective network interfaces in accordance with the described embodiments.

Figure 2A:
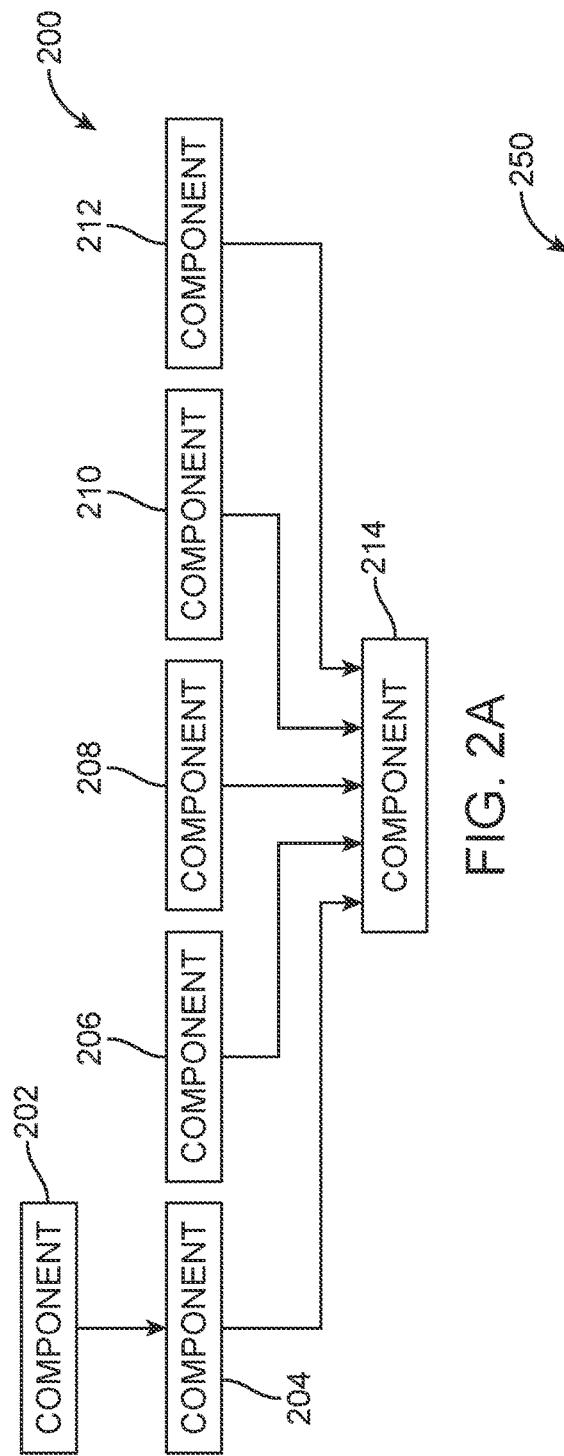
FIGS. 2A and 2B are tree diagrams depicting hierarchies of software package components, in accordance with an example embodiment.
Figure 2B:
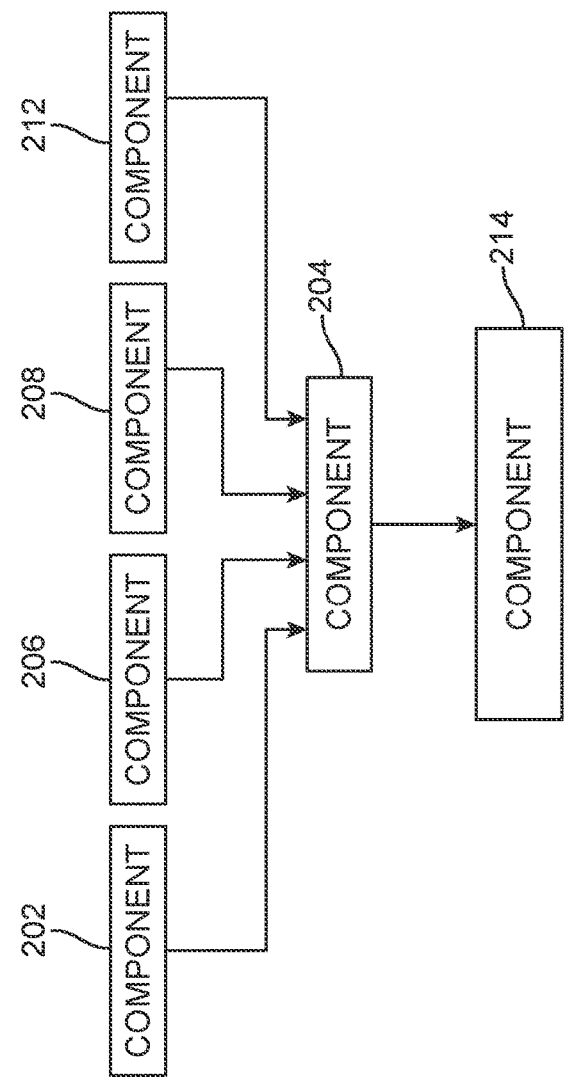

Reference is now made to FIGS. 2A and 2B. FIGS. 2A and 2B are tree diagrams depicting hierarchies 200 and 250 of software package components, in accordance with an example embodiment. Hierarchy 200 of FIG. 2A may be compared to hierarchy 250 of FIG. 2B, in accordance with present embodiments, to identify differences between hierarchies 200 and 250.

With reference to FIG. 2A, hierarchy 200 includes components 202, 204, 206, 208, 210, 212, and 214. As shown, component 214 directly depends on components 204, 206, 208, 210, and 212; component 204 additionally depends on component 202. Thus, component 204 is a sub-component of component 214, and component 202 is a sub-component of component 204.

With reference now to FIG. 2B, hierarchy 250 may correspond to a similar software package as the software package depicted by hierarchy 200. For example, hierarchy 250 may represent the components and relationships between components of an updated version of the same software package. As shown in FIG. 2B, hierarchy 250 includes components 202, 204, 206, 208, 212, and 214. Component 214 includes component 204 as a sub-component, which in turn has sub-components 202, 206, 208, and 212.

When hierarchy 250 is compared to hierarchy 200 in accordance with present embodiments (e.g., using techniques to identify the graph edit distance), several differences may be identified. In particular, as compared to hierarchy 200, hierarchy 250 does not include component 210 as a sub-component of component 214. Additionally, the relationships between components has been modified: in addition to depending on component 202, component 204 now depends on components 206, 208, and 212, which were immediate sub-components of component 214 in hierarchy 200. Accordingly, each identified difference between hierarchy 200 and hierarchy 250 may contribute to an overall score that represents the degree of difference between the hierarchies. In some embodiments, different types of differences can be weighted; for example, the removal of component 210 in hierarchy 250 may be weighted more or less heavily than the change in dependencies of components 206, 208, and 212. In some embodiments, the weight applied to components can be zero, a positive number, or a negative number. Components that are listed in a non-authoritative field of a software bill of material may have a particular weight applied, such as zero or another weight to reduce the influence of those components. Additionally or alternatively, the weight of each edge (e.g., relationship) may be weighted.

In other embodiments, hierarchies, such as hierarchies 200 and 250, may indicate relationships such as Software Package Data Exchange (SPDX) relationships. For example, the edge types of a hierarchy may indicate SPDX relationships like "DESCRIBES," "DESCRIBED_BY," "CONTAINS," "CONTAINED_BY," "DEPENDS_ON," "DEPENDENCY_OF," and the like.

Figure 3A:
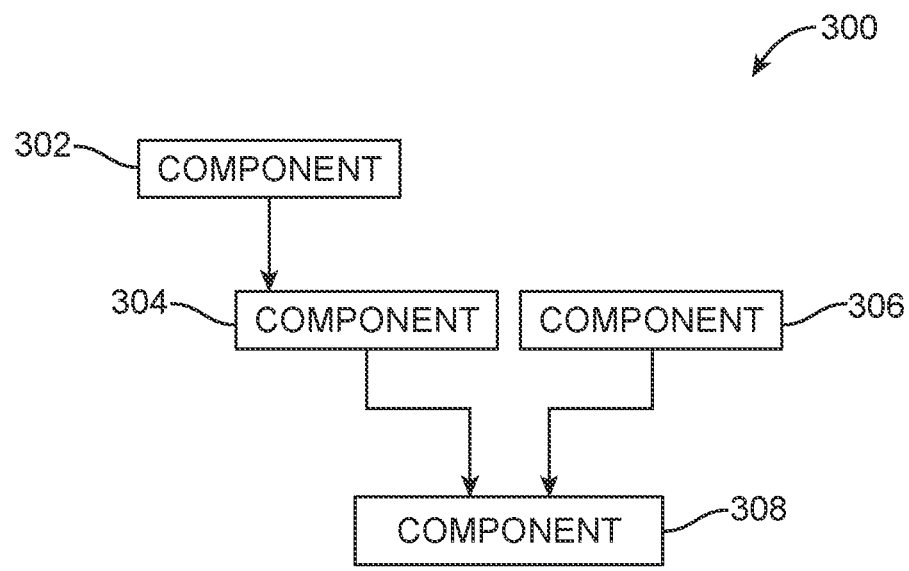
FIGS. 3A and 3B are tree diagrams depicting hierarchies of software package components, in accordance with an example embodiment.
Figure 3B:
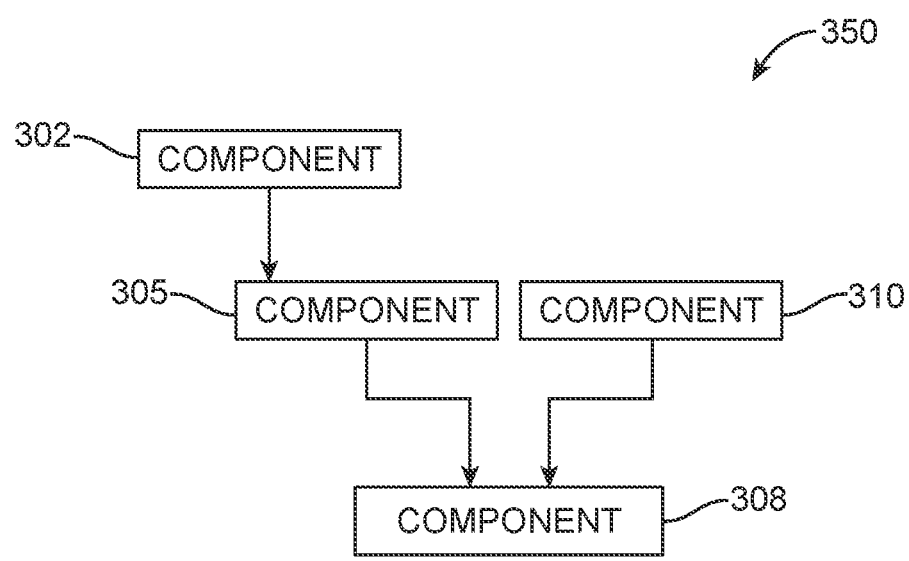

FIGS. 3A and 3B are tree diagrams depicting hierarchies of software package components, in accordance with an example embodiment. Hierarchy 300 of FIG. 3A may be compared to hierarchy 350 of FIG. 3B, in accordance with present embodiments, to identify differences between hierarchies 300 and 350. In various embodiments, different hierarchies, such as hierarchies 300 and 350, may be generated by using different generation tools or processes, by applying a same generation tool or process to different versions of a same software package, by applying a same generation tool or process to a software package at different stages of development, and/or any combinations thereof.

With reference to FIG. 3A, hierarchy 300 includes components 302, 304, 306, and 308. As shown, component 308 directly depends on components 304 and 306; component 304 in turn depends on component 302. Thus, component 302 is a sub-component of component 304, and component 304 is a sub-component of component 308.

With reference now to FIG. 3B, hierarchy 350 may correspond to a similar software package as the software package depicted by hierarchy 300. For example, hierarchy 350 may represent the components and relationships between components of a modified version of the same software package. As shown in FIG. 3B, hierarchy 350 includes components 302, 305, 308, and 310.

When comparing hierarchy 350 to 300, several differences may be identified: in hierarchy 350, component 305 has replaced component 304, and component 310 has replaced component 306. In an example embodiment, component 305 of hierarchy 350, which replaced component 304 of hierarchy 300, may be an updated version of a same component provided by a same vendor. Accordingly, the replacement of component 304 with component 305 may be weighted less heavily, or omitted from consideration entirely, when computing the graph edit distance, as the vendor may be a trusted vendor. The replacement of component 306 with component 310, however, may be weighted more heavily, as component 310 may be flagged as containing a security issue, such as storing data in an unencrypted format, whereas component 306 employed encryption.

Figure 4:
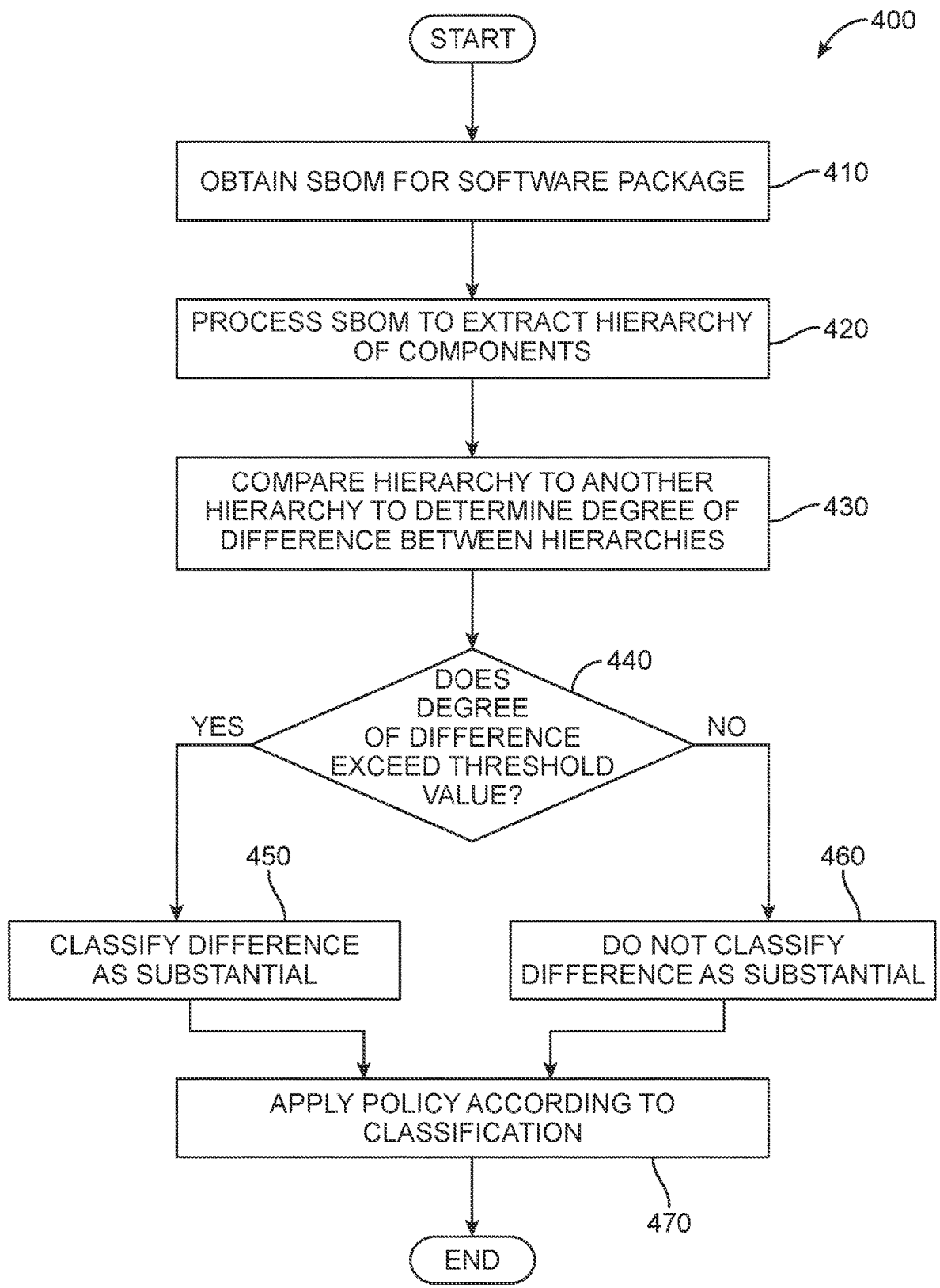
FIG. 4 is a flow chart depicting a method for analyzing software packages to apply a security policy, in accordance with an example embodiment.

FIG. 4 is a flow chart depicting a method 400 for analyzing software packages to apply a security policy, in accordance with an example embodiment.

An SBOM for a software package is obtained at operation 410. The SBOM may include an exhaustive listing of all components that are included in the software package. The SBOM may list the components according to a particular data schema, and the structure of the SBOM may indicate the relationships between components. For example, a component may list any child components upon which the component depends and/or a component may list any parent components of which the component is a sub-component.

The SBOM is processed to extract a hierarchy of components at operation 420. Based on the listing of components and indicated relationships between components, a hierarchal data structure can be assembled that includes an identity (e.g., name) of each component and the relationships between each component. Accordingly, the extracted hierarchy may not include any of the metadata or other data relating to a SBOM. In some embodiments, fields of an SBOM can be labeled as either authoritative or non-authoritative, and any components described in non-authoritative fields may be omitted from the extraction operation and/or the resulting hierarchy.

The process of generating an SBOM in accordance with present embodiments may be repeated for another SBOM so that the hierarchies can be compared to determine the degree of difference between the hierarches at operation 430. The compared hierarchies may correspond to similar or related versions of a software package. In some embodiments, the compared hierarchies are extracted from SBOMs that are automatically generated from a same software package using different automated SBOM generation tools; thus, comparing the hierarchies can indicate whether the SBOM generation tools function similarly (e.g., by producing substantially similar SBOMs) or not. In other embodiments, both SBOM hierarchies are derived from the same software package at different stages of development, and in others from two similar software packages, e.g. two versions of the software package. The hierarchies may be compared using any conventional or other graph edit distance analysis techniques, which identify differences between graphs and quantify the magnitude of differences overall. In various embodiments, weights may be applied to different types of differences so that insertions, deletions, substitutions, changes in dependencies, and/or any other differences can be weighted differently. In some embodiments, components that are known good components (e.g., either pre-approved, obtained from an approved source, etc.) may be omitted from the comparison, because those components may be trusted and therefore should not contribute to a graph edit distance. Additionally, known bad components can be weighted or flagged to cause the comparison to indicate the presence of the bad components. For example, components that are known good components can be weighted with a weight of zero to effectively ensure that differences involving those components do not contribute to the overall score for the degree of difference between hierarchies. In other embodiments, components that are known bad components (e.g. not permitted in the producer's software, known to have exploited vulnerabilities, etc.) may be given more significance in the comparison, because those components may not be trusted and therefore should contribute more significantly to the graph edit distance. For example, components that are known bad components can be weighted with a weight far from zero to effectively ensure that differences involving these components greatly contribute to the overall score for the degree of difference between hierarchies.

The overall degree of difference between two SBOM hierarchies is compared to a threshold value to determine whether the degree of difference exceeds the threshold at operation 440. The threshold value may be a predefined value for a graph edit distance or may be selected from a group of graph edit distances based on the category of the software components, packages, function of the software packages, and the like. For example, if the software components are critical to the package (e.g. the components provide a cryptographic functionality or process sensitive data), a smaller threshold for graph edit distance may be used. Similarly, if the software components are not critical to the package (e.g. the components process entertainment or media player data), a larger threshold may be utilized. In some embodiments, the threshold value is selected using a machine learning model, as is depicted and described in further detail with reference to FIG. 5.

If the degree of difference exceeds the threshold, then the difference is classified as substantial at operation 450. Otherwise, the degree of difference is not classified as substantial at operation 460. In some embodiments, the degree of difference receives another classification, such as "minor," "de minimis," and the like. The granularity of the labels for degrees of difference can be defined by defining one or more other thresholds to provide a plurality of levels of difference.

The security policy is applied according to the classification of the difference in software packages at operation 470. In some embodiments, if the degree of difference is substantial, then the software package under scrutiny may be denied access to a system, or may be provided with a limited set of permissions, etc. Alternatively, if the degree of difference is not substantial (e.g., does not exceed the threshold value), then the software package may be permitted access to a computing resource. Accordingly, based on the degree of difference between an unknown software package and another software package that may be trusted, present embodiments can selectively permit or deny access to a computing system, a computing environment, a database, the ability to execute certain commands, and the like.

Figure 5:
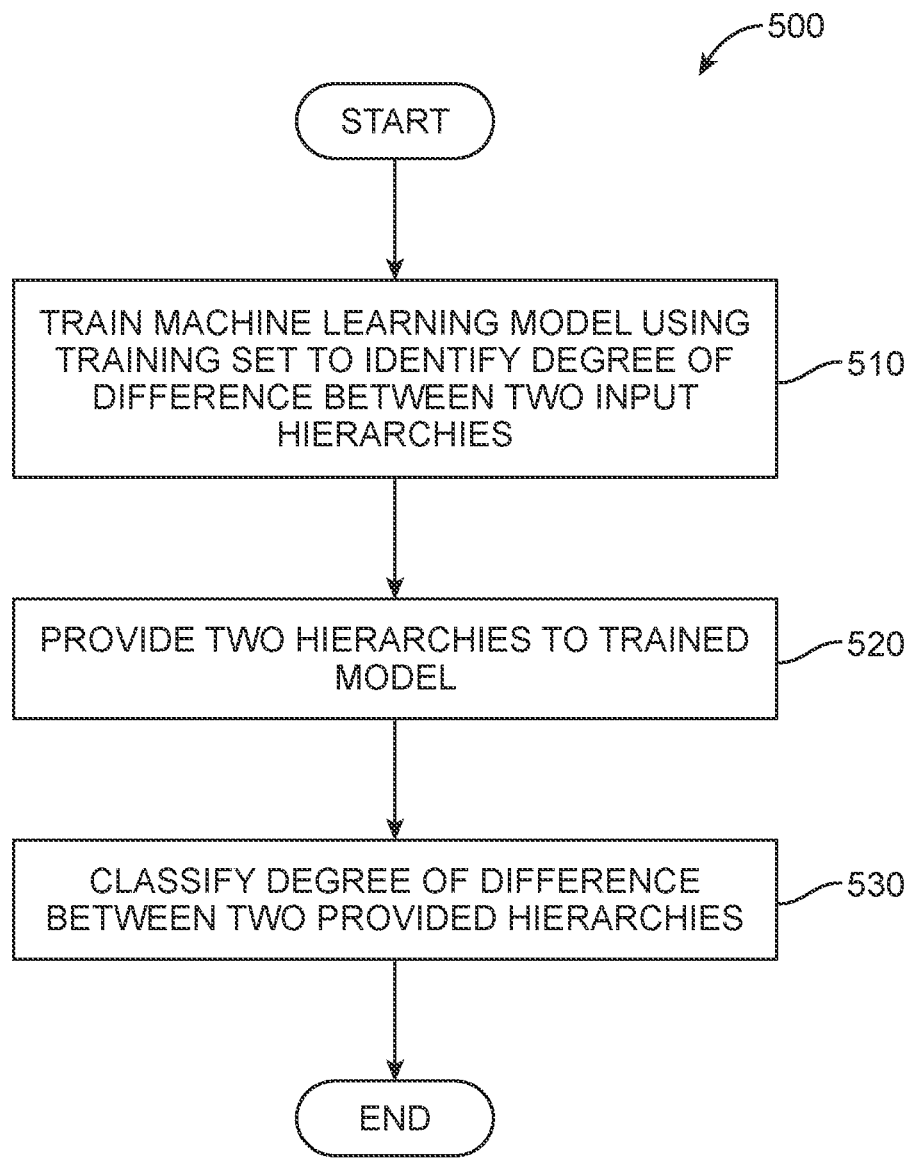
FIG. 5 is a flow chart depicting a method for training and applying a machine learning model, in accordance with an example embodiment.

FIG. 5 is a flow chart depicting a method 500 for training and applying a machine learning model, in accordance with an example embodiment.

A machine learning model is trained using a training set to identify degrees of difference between two input hierarchies at operation 510. The training set may include examples of values for degrees of difference for a variety of example pairs of hierarchies. Each degree of difference value may be further labeled to indicate whether the value is substantial or not. In some embodiments, a variety of different labels may be used, such as substantial, minor, de minimis, and the like. The machine learning model may be trained using the training data to perform pattern recognition so that the resulting trained model can directly compute degree of difference values. Additionally or alternatively, the machine learning model can be trained using training data of pairs of hierarchies that are labeled as to whether a degree of difference between each pair of hierarchies indicates that an analyzed software package should be permitted or not permitted for a computing environment. In some embodiments, the machine learning model is an artificial neural network, such as a recurrent neural network (RNN) or convolutional neural network (CNN). The machine learning process may employ multi-task learning techniques so that a desired level of accuracy is achieved for each desired category of software package. Thus, the resulting model can achieve convergence for each category of software package, and will be much more accurate for any categories of software package that are underrepresented with respect to other categories in the set of training data.

Two input hierarchies are provided to the trained machine learning model at operation 520. In one embodiment, an overall score of the degree of difference between hierarchies (e.g., a graph edit distance value or other value representative of the difference between compared hierarchies) may be computed. This overall score can then be used to classify the degree of difference between the input hierarchies at operation 530. In particular, the machine learning model may determine whether the difference between the hierarchies constitutes a substantial difference or other category of difference. In some embodiments, the degree of difference that is determined by the machine learning model is further based on an input that includes a category of the software package, so that a threshold value can be selected that is suitable for that category. Depending on the outcome, a security policy may thus be applied to permit or deny access of the software package to a computing resource.

Figure 6:
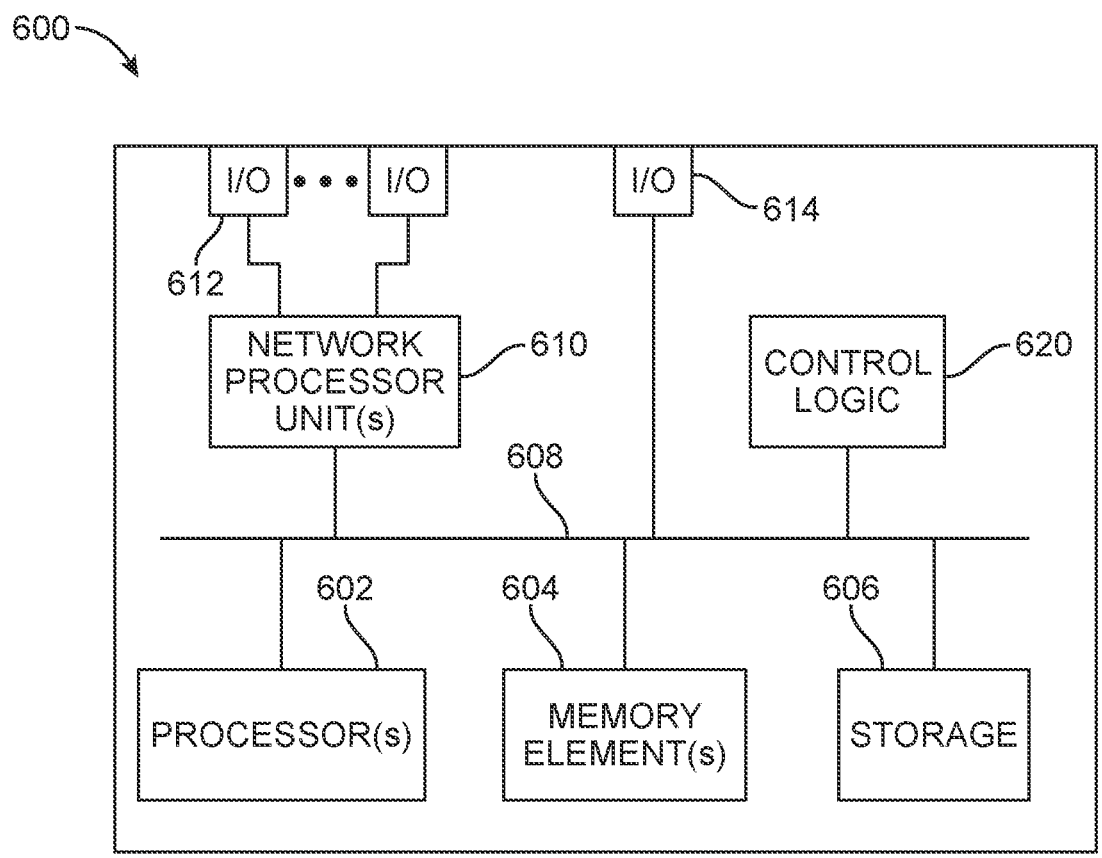
FIG. 6 is a block diagram depicting a computing device configured to automatically analyze SBOMs, in accordance with an example embodiment.

Referring to FIG. 6, FIG. 6 illustrates a hardware block diagram of a computing device 600 that may perform functions associated with operations discussed herein in connection with the techniques depicted in FIGS. 1-5. In various embodiments, a computing device, such as computing device 600 or any combination of computing devices 600, may be configured as any entity/entities as discussed for the techniques depicted in connection with FIGS. 1-5 in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 602.11 (e.g., Wi-Fi®/Wi-Fib®), IEEE 602.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided comprising: processing a first software bill of materials for a software package to extract a plurality of components of the software package, wherein the first software bill of materials indicates a first hierarchy of components based on relationships between components, comparing the first hierarchy to a second hierarchy, the second hierarchy corresponding to a second software bill of materials, to determine a degree of difference between the first hierarchy and the second hierarchy, comparing the degree of difference to one or more threshold values, and applying a security policy with respect to the software package according to a comparison of the degree of difference to the one or more threshold values.

In another form, the method further includes selecting the security policy based on comparison of the degree of difference to the one or more threshold values.

In another form, the security policy is selected from a group of: a deny policy that denies the software package from a computing environment, wherein the deny policy is selected in response to classifying the degree of difference as substantial based on the degree of difference being beyond one or more threshold values, and an allow policy that permits the software package access to a computing environment, wherein the allow policy is selected based on the degree of difference being within one or more threshold values.

In another form, the security policy further transmits a notification, wherein the notification performs one of: indicating that the security policy is applied to the software package, and indicating that the security policy is to be applied to the software package upon user confirmation.

In another form, the security policy denies the software package by performing one or more of: denying the software package from being downloaded into a computing environment, denying the software package from being executed in the computing environment, denying the software package access to a communication network, denying the software package access to a data storage, and denying the software package permission to execute a command in a computing system.

In another form, the degree of difference is determined according to a graph edit distance. In another form, the method further includes identifying one or more known components in the first hierarchy or in the second hierarchy, wherein the one or more known components are weighted.

In another form, the degree of difference is determined according to a machine learning model.

In another form, results from previous comparisons of software bills of materials are used to train a machine learning model to select the security policy.

In another form, the first software bill of materials and the second software bill of materials correspond to a same software package, and wherein the first software bill of materials and the second software bill of materials are obtained by performing one of: applying different generation tools to each of the first software bill of materials and the second software bill of materials, generating the first software bill of materials and second software bill of materials at different phases of a software development lifecycle, and generating the first software bill of materials and the second software bill of materials by processing different versions of the same software package.

In one form, a computer system is provided, comprising: one or more computer processors; one or more computer readable storage media; and program instructions stored on the one or more computer readable storage media for execution by at least one of the one or more computer processors, the program instructions comprising instructions to: process a first software bill of materials for a software package to extract a plurality of components of the software package, wherein the first software bill of materials indicates a first hierarchy of components based on relationships between components, compare the first hierarchy to a second hierarchy, the second hierarchy corresponding to a second software bill of materials, to determine a degree of difference between the first hierarchy and the second hierarchy, compare the degree of difference to one or more threshold values, and apply a security policy with respect to the software package according to a comparison of the degree of difference to the one or more threshold values.

In one form, one or more computer readable storage media is provided, the one or more computer readable storage media collectively having program instructions embodied therewith, the program instructions executable by a computer to cause the computer to: process a first software bill of materials for a software package to extract a plurality of components of the software package, wherein the first software bill of materials indicates a first hierarchy of components based on relationships between components, compare the first hierarchy to a second hierarchy, the second hierarchy corresponding to a second software bill of materials, to determine a degree of difference between the first hierarchy and the second hierarchy, compare the degree of difference to one or more threshold values, and apply a security policy with respect to the software package according to a comparison of the degree of difference to the one or more threshold values.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   processing a first software bill of materials for a software package to extract a plurality of components of the software package, wherein the first software bill of materials indicates a first hierarchy of components based on relationships between components;
   comparing the first hierarchy of the plurality of components to a second hierarchy of components, the second hierarchy of components corresponding to a second software bill of materials, to determine a degree of difference between the first hierarchy and the second hierarchy;
   comparing the degree of difference to one or more threshold values; and
   applying a security policy with respect to the software package according to a comparison of the degree of difference to the one or more threshold values.

2. The computer-implemented method of claim 1, further comprising selecting the security policy based on comparison of the degree of difference to the one or more threshold values.

3. The computer-implemented method of claim 1, wherein the security policy is selected from a group of:
   a deny policy that denies the software package from a computing environment, wherein the deny policy is selected in response to classifying the degree of difference as substantial based on the degree of difference being beyond one or more threshold values, and
   an allow policy that permits the software package access to a computing environment, wherein the allow policy is selected based on the degree of difference being within one or more threshold values.

4. The computer-implemented method of claim 1, wherein the security policy further transmits a notification, wherein the notification performs one of: indicating that the security policy is applied to the software package, and indicating that the security policy is to be applied to the software package upon user confirmation.

5. The computer-implemented method of claim 1, wherein the security policy denies the software package by performing one or more of: denying the software package from being downloaded into a computing environment, denying the software package from being executed in the computing environment, denying the software package access to a communication network, denying the software package access to a data storage, and denying the software package permission to execute a command in a computing system.

6. The computer-implemented method of claim 1, wherein the degree of difference is determined according to a graph edit distance.

7. The computer-implemented method of claim 6, further comprising:
   identifying one or more known components in the first hierarchy or in the second hierarchy, wherein the one or more known components are weighted.

8. The computer-implemented method of claim 1, wherein the degree of difference is determined according to a machine learning model.

9. The computer-implemented method of claim 1, wherein results from previous comparisons of software bills of materials are used to train a machine learning model to select the security policy.

10. The computer-implemented method of claim 1, wherein the first software bill of materials and the second software bill of materials correspond to a same software package, and wherein the first software bill of materials and the second software bill of materials are obtained by performing one of: applying different generation tools to each of the first software bill of materials and the second software bill of materials, generating the first software bill of materials and second software bill of materials at different phases of a software development lifecycle, and generating the first software bill of materials and the second software bill of materials by processing different versions of the same software package.

11. An apparatus comprising: one or more computer processors;
   a network interface configured to enable network communications;
   one or more computer readable storage media; and
   program instructions stored on the one or more computer readable storage media for execution by at least one of the one or more computer processors, the program instructions comprising instructions to:
   process a first software bill of materials for a software package to extract a plurality of components of the software package, wherein the first software bill of materials indicates a first hierarchy of components based on relationships between components;
   compare the first hierarchy of the plurality of components to a second hierarchy of components, the second hierarchy of components corresponding to a second software bill of materials, to determine a degree of difference between the first hierarchy and the second hierarchy;

compare the degree of difference to one or more threshold values; and apply a security policy with respect to the software package according to a comparison of the degree of difference to the one or more threshold values.

12. The apparatus of claim 11, wherein the program instructions further comprise instructions to:

selecting the security policy based on comparison of the degree of difference to the one or more threshold values.

13. The apparatus of claim 11, wherein the security policy is selected from a group of:

a deny policy that denies the software package from a computing environment, wherein the deny policy is selected in response to classifying the degree of difference as substantial based on the degree of difference being beyond one or more threshold values, and an allow policy that permits the software package access to a computing environment, wherein the allow policy is selected based on the degree of difference being within one or more threshold values.

14. The apparatus of claim 11, wherein the security policy further transmits a notification, wherein the notification performs one of: indicating that the security policy is applied to the software package, and indicating that the security policy is to be applied to the software package upon user confirmation.

15. The apparatus of claim 11, wherein the security policy denies the software package by performing one or more of: denying the software package from being downloaded into a computing environment, denying the software package from being executed in the computing environment, denying the software package access to a communication network, denying the software package access to a data storage, and denying the software package permission to execute a command in a computing system.

16. One or more non-transitory computer readable storage media collectively having program instructions embodied therewith, the program instructions executable by a computer to cause the computer to:

process a first software bill of materials for a software package to extract a plurality of components of the software package, wherein the first software bill of materials indicates a first hierarchy of components based on relationships between components;

compare the first hierarchy of the plurality of components to a second hierarchy of components, the second hierarchy of components corresponding to a second software bill of materials, to determine a degree of difference between the first hierarchy and the second hierarchy;

compare the degree of difference to one or more threshold values; and apply a security policy with respect to the software package according to a comparison of the degree of difference to the one or more threshold values.

17. The one or more non-transitory computer readable storage media of claim 16, wherein the program instructions further cause the computer to:

selecting the security policy based on comparison of the degree of difference to the one or more threshold values.

18. The one or more non-transitory computer readable storage media of claim 16, wherein the security policy is selected from a group of:

a deny policy that denies the software package from a computing environment, wherein the deny policy is selected in response to classifying the degree of difference as substantial based on the degree of difference being beyond one or more threshold values, and an allow policy that permits the software package access to a computing environment, wherein the allow policy is selected based on the degree of difference being within one or more threshold values.

19. The one or more non-transitory computer readable storage media of claim 16, wherein the security policy further transmits a notification, wherein the notification performs one of: indicating that the security policy is applied to the software package, and indicating that the security policy is to be applied to the software package upon user confirmation.

20. The one or more non-transitory computer readable storage media of claim 16, wherein the security policy denies the software package by performing one or more of: denying the software package from being downloaded into a computing environment, denying the software package from being executed in the computing environment, denying the software package access to a communication network, denying the software package access to a data storage, and denying the software package permission to execute a command in a computing system.

* * * * *